United States Patent
Thapar

(10) Patent No.: US 11,062,046 B1
(45) Date of Patent: Jul. 13, 2021

(54) SELF-REFERENCING DATA ENCRYPTION

(71) Applicant: DeCurtis LLC, Orlando, FL (US)

(72) Inventor: Ajay Thapar, Bangalore (IN)

(73) Assignee: DeCurtis LLC, Orlando, FL (US)

( * ) Notice: Subject to any disclaimer, the term of this patent is extended or adjusted under 35 U.S.C. 154(b) by 0 days.

(21) Appl. No.: 17/145,827

(22) Filed: Jan. 11, 2021

(51) Int. Cl.
| | |
|---|---|
| *G06F 21/62* | (2013.01) |
| *G06F 21/78* | (2013.01) |
| *G06F 16/248* | (2019.01) |
| *G06F 21/60* | (2013.01) |
| *G06F 21/64* | (2013.01) |
| *G06F 21/72* | (2013.01) |
| *G06F 21/54* | (2013.01) |

(52) U.S. Cl.
CPC ........ *G06F 21/6227* (2013.01); *G06F 16/248* (2019.01); *G06F 21/602* (2013.01); *G06F 21/64* (2013.01); *G06F 21/72* (2013.01); *G06F 21/78* (2013.01)

(58) Field of Classification Search
None
See application file for complete search history.

(56) References Cited

U.S. PATENT DOCUMENTS

| | | | | |
|---|---|---|---|---|
| 10,496,494 B1* | 12/2019 | Haloi | .................... | G06F 16/148 |
| 2004/0064688 A1* | 4/2004 | Jacobs | ................ | H04L 63/0245 |
| | | | | 713/150 |
| 2004/0225890 A1* | 11/2004 | Kang | .................... | H04L 63/061 |
| | | | | 713/193 |
| 2006/0274899 A1* | 12/2006 | Zhu | ......................... | H04L 9/083 |
| | | | | 380/281 |
| 2016/0036785 A1* | 2/2016 | Ambroz | ............. | H04L 63/0428 |
| | | | | 713/170 |
| 2017/0149567 A1* | 5/2017 | Moskal | ................... | G06F 21/64 |
| 2020/0007320 A1* | 1/2020 | Xu | .......................... | H04L 29/06 |

FOREIGN PATENT DOCUMENTS

| | | | | |
|---|---|---|---|---|
| EP | 2078548 A2 * | 7/2009 | ............. | G06F 21/51 |

OTHER PUBLICATIONS

Achieving Secure, Scalable, and Fine-grained Data Access Control in Cloud Computing. Yu et al. IEEE. (Year: 2010).*
Efficient Secure Query Evaluation over Encrypted XML Databases. Wang et al. ACM. (Year: 2006).*
An approach for Big Data Security based on Hadoop Distributed File system. Mahmoud et al. IEEE. (Year: 2018).*
Data protection on hadoop distributed file system by using encryption algorithms: a systematic literature review. Naisuty et al. IOP Publishing. (Year: 2020).*
A framework for preservation of cloud users' data privacy using dynamic reconstruction of metadata> Waqar et al. Elsevier. (Year: 2012).*

* cited by examiner

*Primary Examiner* — Venkat Perungavoor
(74) *Attorney, Agent, or Firm* — Freeborn & Peters

(57) ABSTRACT

Systems, methods, and computer-executable instructions for protecting data that includes receiving a request for a first data value. A data store is queried for a first stored data value. The first stored data value is received which contains a security prefix and encrypted data. From the security prefix, a cryptography algorithm and a key are determined. The encrypted data is decrypted using the cryptography algorithm and the key. The decrypted data is returned.

20 Claims, 6 Drawing Sheets

300

200

| ID 210 | DATA1 220 | DATA2 230 |
|---|---|---|
| 001 | key1:crypto1:v1:6QiTPkoVJddE | blue |
| 002 | key2:crypto1:v1:Hi3gl4adb/ab3 | brown |
| 003 | key1:crypto2:v1:DWxB6wZzo4e | blue |
| 004 | key1:crypto1:v2:Z5asdg^hwSG | hazel |
| 005 | key1:void:v1:Robert | blue |
| 006 | Robert | blue |
| 007 | Roberta | key3:crypto3:v6:I7rKss4gsaGda |
| 008 | key4:crypto4:v1:k2$dbaGaWg3 | key4:crypto4:v1:aVA#gGW$asf |
| 009 | key5:crypto1:v1:23gAg#w4sfs | key6:crypto1:v1:fKsS4G3g$dsa |
| 010 | key6:crypto1:v1:bBwrb34WEgr | key6:crypto2:v1:Fpg$gwqgasrg |
| 011 | key6:crypto1:v1:mi8*A(kktJjrjav | key6:crypto1:v2:dEWht5ehkdsS |
| 012 | Robbie | grey |
| 013 | key1:crypto1:v1|09aglGK4gtis1 | blue |

*FIG. 2*

SELF-REFERENCING DATA ENCRYPTION

BACKGROUND

As companies, government agencies, and other entities collect and store personal information, the protection of the personal data has become increasingly important. As data is increasingly stored in databases accessible over the internet, data breaches have become a more common occurrence. Third-parties who store data, including personal identification data, therefore, must take affirmative actions in protecting its data. Encryption of data is one way data can be protected. For example, all data in a database or specific columns in a structured database may be encrypted using known techniques. These techniques, however, are not flexible and do not allow easy porting of data between different encryption techniques, encryption keys, etc. A more flexible approach to data encryption would be useful in protecting stored data.

BRIEF DESCRIPTION OF DRAWINGS

FIG. 2 illustrates an example data store with encrypted data in accordance with respective examples.

DETAILED DESCRIPTION

Data collected about individuals continues to increase. Accordingly, the importance of protecting this data has also increased. Data related to individuals may contain personally identifiable information (PII). PII allows an individual to be identified. Countries, states, and industries have different and sometimes conflicting regulations regarding data collection of PII.

In addition to the different regulations, internal considerations may also warrant treating data differently in various scenarios. For example, clients, groups, divisions, departments, etc., may want to store the same or similar data, but with different levels of protection. Previous solutions allowed a database to be encrypted or for tables or columns of a database to be encrypted. These solutions, however, were inflexible. The work required for changes to data protection was substantial. For example, if a database table was to have encryption turned off, all of the data would be decrypted at once. Various embodiments allow for encryption to be turned off without requiring the data to be decrypted at once. Rather, the data may remain encrypted until the data is written back into the database.

As another example of flexibility, individual columns, rows, or intersection of a column and a row may be encrypted differently. For example, a database may contain data from multiple entities. Each entity may have different data protection requirements. As an example, data in a column may be encrypted for one entity and not encrypted for another. Various embodiments allow the data to be protected as required by the entities and stored in the same table or column. Various embodiments also allow different cryptographic algorithms or different keys to be used to encrypt data.

Figure 1:
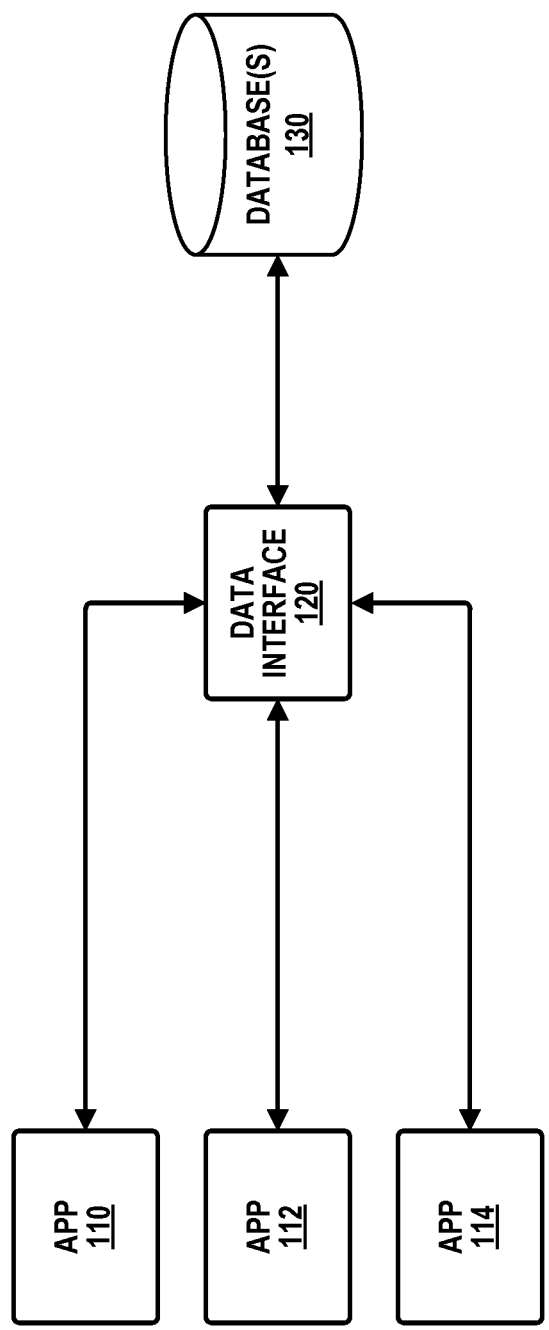
FIG. 1 is a system diagram of an encryption system in accordance with respective examples.

FIG. 1 is a system diagram of an encryption system 100 in accordance with respective examples. Various applications 110, 112, and 114 store data in a data store such as a database 130. The applications 110, 112, and 114 may store PII as well as other data. Data is stored in the database 130 via a data interface 120. In various embodiments, the data interface 120 determines if data needs to be encrypted before writing to the database 130 or if the data needs to be decrypted before sending to an application. The data interface 120 may also create a security prefix that describes how the data is stored. The security prefix may be stored with the data in the database 130. The security prefix may later be used by the data interface 120 when retrieving data to determine if and how to decrypt the data.

FIG. 2 illustrates an example of a portion of a data store 200 with encrypted data in accordance with respective examples. The portion of the data store 200 may be a table within the data store with three columns: ID 210, data1 220, and data2 230. The columns data1 220 and data2 230 are text or character type columns. The ID 210 column may contain an identifier that is associated with a person, such that the data stored in columns 220 and 230 may contain PII. As an example, the data shown in FIG. 2 may include a name in the data1 column 220 and eye color in the data2 column 230.

Figure 3:
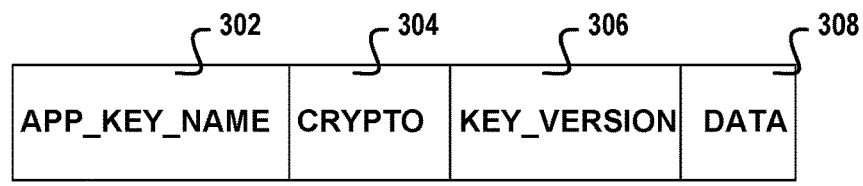
FIG. 3 illustrates a security prefix with associated data in accordance with respective examples.

The data values stored in the columns 220 and 230 may be encrypted or not encrypted. In addition, the data may contain a security prefix that provides information regarding how the data is stored. FIG. 3 illustrates a security prefix 300 with associated data 308 in accordance with respective examples. The security prefix 300 includes a key name 302. The key name 302 may identify a key that is associated with an application or a portion of an application. The security prefix 300 also includes a cryptography algorithm 304 used to encrypt/decrypt data. The security 300 may also include a key version 306 that indicates which version of a key to use to encrypt/decrypt data. The data 308 is protected using the cryptography algorithm with the appropriate key determined from the key name 302 and the key version 306. When data is written to a data store, the data is encrypted using the cryptography algorithm with the appropriate key determined from the key name 302 and the key version 306. Then when the data 308 is read, the data 308 is decrypted the cryptography algorithm with the appropriate key determined from the key name 302 and the key version 306. The decrypted data may then be used by an application.

In some examples, the encrypted data and the security prefix are stored together in a data store. Accordingly, the stored data is self-referencing in that the data contains the security prefix used to decrypt the encrypted data.

In various embodiments, the security prefix 300 may include just a key identifier. The key identifier is then used to determine the appropriate cryptography algorithm and key version. In other embodiments, the security prefix 300 includes the key identifier and the cryptography algorithm, but does not include a key version identifier. These embodiments, however, are not as flexible as embodiments with a security prefix as shown in FIG. 3. For example, an application that uses a security prefix 300 without a key version identifier cannot dynamically change to a new version of a key without updating previously stored and encrypted data in bulk.

Returning to FIG. 2, one or more applications may access the data stored in the shown data store 200. Various applications may have different requirements as to how to protect data. In addition, a single application may store data differently based on any number of factors. The disclosed embodiments are able to read and write data using the security prefix such that data may be encrypted/decrypted in various ways.

As an example, the ID row 001 includes encrypted data in the data1 column and unencrypted data, blue, in the data2 column. The data stored in the data2 column may be stored as plaintext. When reading the data1 data, the security prefix "key1:crypto1:v1" is used to decrypt the encrypted data stored in the data1 column. The security prefix is analyzed to determine the key name, the cryptographic algorithm to use, and the key version to use. In this case, the values "key1" and "v1" are used to determine a cryptographic key to decrypt the data using the cryptographic algorithm associated with the "crypto1" identifier.

The same application or a different application may access the data stored in the row associated with ID 002. The data in the data1 column 220 is analyzed to determine the data includes a security prefix. In an example, the security prefix may be identified by searching for four sets of data separated by a separator such as ":". If the data stored in the data1 column1 220 includes four sets of data, a security prefix is potentially found. Additional analysis may be done to determine if the four sets of data contains valid data. For example, the available cryptographic algorithms may be known. Accordingly, if the data that identifies a cryptographic algorithm contains an unknown value, a security prefix may be assumed to not be found. An error or warning may also be logged to account for errors or known but unsupported cryptographic algorithms.

Once a valid security prefix is found an application uses the key name and key version to identify the appropriate key. In various embodiments, the key is not stored in the data store 200 due to data security practices. In an example, an application has an associated configuration that is used to identify the appropriate key using the key name and key version. In addition, the application or a data API may be used to provide the key and data to the cryptographic algorithm indicated in the security prefix. The data stored in rows associated with IDs 003 and 004 illustrate security prefixes that use a different cryptographic algorithm, crypto2, and a different key identifier, v2.

Data may also be stored unencrypted in the data store 200. Unencrypted data may be associated with a security or stored without a security prefix. For example, the row associated with ID 005 includes a security prefix with a cryptographic algorithm of void. The void value, or any appropriate identifier, indicates that the data is unencrypted and there is no need to decrypt the data before providing the data to an application. In another example, the stored data does not contain any security prefix, such as the row associated with ID 006. In this example, the data would be analyzed and no security prefix would be found. Based on not finding a security prefix, the data is assumed to be unencrypted and provided to a requesting application without any decryption. In another example, there is a default security prefix or default portions of a security prefix. If a security prefix or any part of the security prefix is not found, the default values are used to encrypt/decrypt the data.

The stored data may include protected data that is intermixed with unprotected or other protected data, but with different types of protection. In addition, data may be protected in one column but not another. For example, the row associated with ID 007 shows data protected in the data2 column 230 but not in the data1 column 220. In addition, data in multiple columns may be protected. The data in each column, however, may have different security prefixes, indicating that the data is protected in different ways. For example, the rows associated with IDs 009, 010, and 011 illustrate different security prefixes between the data1 column 220 and the data2 column.

As shown in FIG. 2, data may be protected using different keys, cryptography algorithms, and different versions of a key. This data may be intermixed within a single table or database. This flexibility illustrates how the security prefix of data can be changed dynamically by an application. In addition, a change to one security prefix does not require changes to other similar security prefixes. Accordingly, an application can cycle through keys as data is written back to a data store, rather, than requiring porting all of the data to a new key at once. In addition, data security may be turned on or off without requiring data porting. When data security is turned off, the data may remain encrypted until the data is written back. When the data is written back, the data is written in an unencrypted form. Alternatively, when data security is turned on the data may remain unencrypted until the data is rewritten. In another example, unencrypted data is read and written back to the database in encrypted form. This process, however, does not take the data store offline or make the data unavailable. Rather, applications may continue to access the data using the stored security prefix. As the data is encrypted, the security prefix will describe how to access the data. Accordingly, data porting may be done as resources allow and without impacting any running application.

Writing data to a data store includes creating the security prefix to add to the data. Before writing data to the data store, a data API determines if the data is to be protected. This decision may be based on configuration data. If data security is needed, the key, the cryptography algorithm, and the version of the key is determined. The data is then encrypted. The encrypted form of data along with the security prefix are then stored in the data store. In an example, the encrypted data is combined with the security prefix and stored in a single column or cell of the data store.

Some embodiments are implemented as part of a data API, such as the data interface 120. In these embodiments, multiple applications may use the data interface 120, as shown in FIG. 1. The ability to turn on or off encryption does not require any coding changes to the applications. Rather, a configuration change may be made to enable or disable data security. The data API may then access and store data according to the updated configuration. In some examples, an application may be configured dynamically allowing changes to data security without having to stop or take an application offline. In addition to enabling or disabling data security, the key, the key version, or the cryptography algorithm may also be updated without requiring any coding changes to any application.

As the security prefix may be stored with the data and the data API is able to process the data based on the security prefix, an application does not need to encrypt or decrypt any data. Accordingly, an application may work with unencrypted data and may be unaware that the data is stored in an encrypted format. The application receives unencrypted data from the data API and sends unencrypted data to the data API. The application relies on the data API to provide the appropriate data security.

Various disclosed embodiments store the combination of the security prefix and data as text or a character string. Applications, however, may want to store data that is not text or a character string. For example, an application may want to store an integer. The data API may encrypt the integer and store the resulting encrypted string. While the data API may store a string, the data API provides an integer to the application. This may be accomplished by the data API converting the decrypted value from a string into an integer. In one example, the data API provides a mechanism to receive an integer rather than a string. For example, the data API may provide a getInteger method. In addition, when storing an integer, the data API may accept an integer and then encrypt the integer or change the integer into a string and then encrypt. In another example, the data type may be added to the security prefix. In this example, when reading data, the data API may convert the unencrypted data into the appropriate data type.

As an example of storing data types, an instantiated class object in an application may be serialized and then stored. The data type stored with the security prefix would indicate the class of the object. The data API may decrypt the data and then instantiate the object using known serialization methods.

FIG. 2 illustrates an exemplary table in a relational database. Disclosed embodiments also work with non-relational databases. Any data store that allows a security prefix to be stored in a way associated with data may be used. For example, a non-relational database may be used by appending a security prefix to data prior to storing the data. In other examples, the security prefix may be prepended or postpended to the data.

Figure 4:
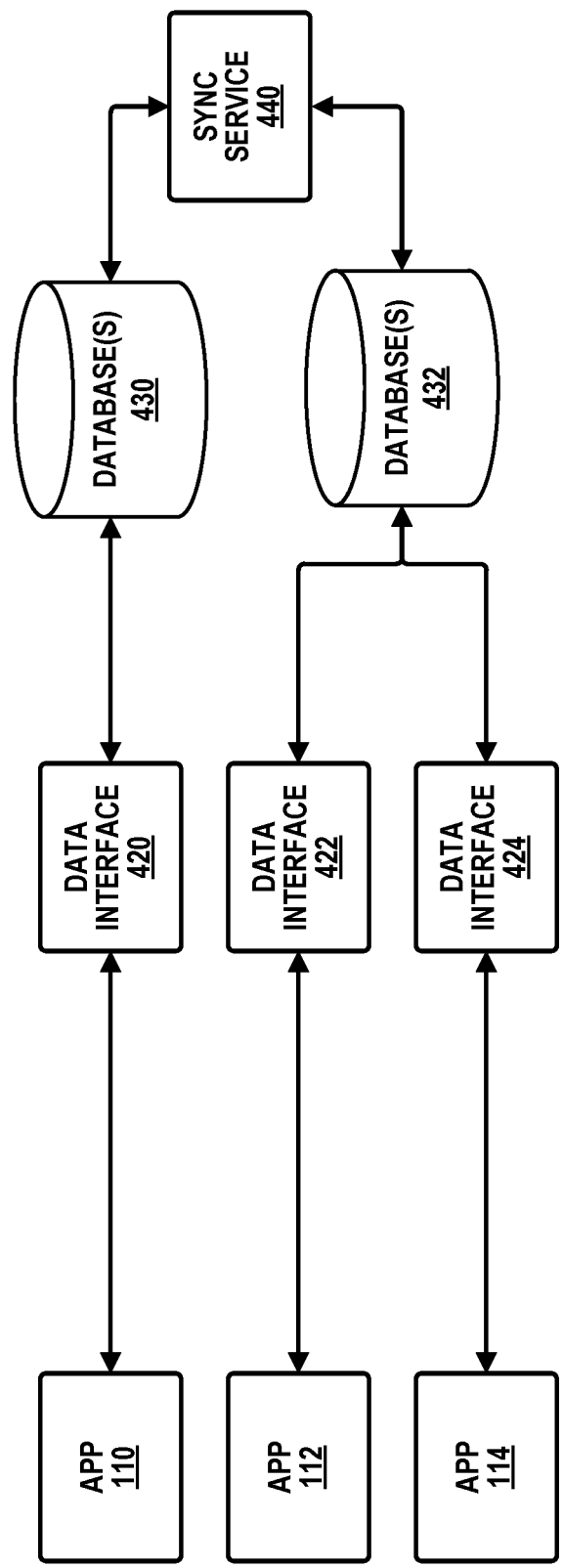
FIG. 4 is a system diagram of an encryption sync system in accordance with respective examples.

FIG. 4 is a system diagram of an encryption sync system 400 in accordance with respective examples. In this sync system 400, data that is written to one database 430 is also written or synced to another database 432. In addition, data written to the database 432 may also be synced to the database 430. In other examples, written data to the databases 430 and 432 may be written to another database (not shown). In some examples, an application, such as the application 110, may write data to the database 430 through a data interface 420. The database 430 may be a local database or a database controlled by a first entity. The data may be synced to another database, such as the database 432, via a sync service 440. In some examples, the other database is a remote database or a database controlled by a second, different entity.

Other applications, such as the applications 112 and 114, may write to the database 432 using data interfaces 424 and 426, respectively. The sync service 440 may monitor databases, such as the databases 430 and 432, for modifications to data. In another example, a data interface, such as the data interfaces 420, 424, or 426, may communicate changes to data to the sync service 440.

In some examples, the sync service 440 manages the encryption between different databases. For example, data stored in one database may be encrypted one way and the data synced to a different database may be stored encrypted in a different way. As an example, the application 112 may store data in the database 432 using a cryptographic algorithm. In some examples, the cryptographic algorithm is the one used by the Java Cryptography API. The data in the database 432 may be synced to a different database, such as the database 430. Data stored in the synced database may be encrypted using a different cryptographic algorithm. For example, data stored in the synced database may be encrypted using an online encryption service, such as, Vault by HashiCorp.

Continuing the above example, the sync service 440 may read encrypted data from the database 430. Using the security prefix, the sync service 440 may decrypt the data as described above. Prior to writing the data to the sync database, the sync service 440 may encrypt the data using the online encryption service. In addition, the sync service 440 may create the corresponding security prefix. The sync service 440 may then write the encrypted data along with the security prefix to the sync database.

Figure 5:
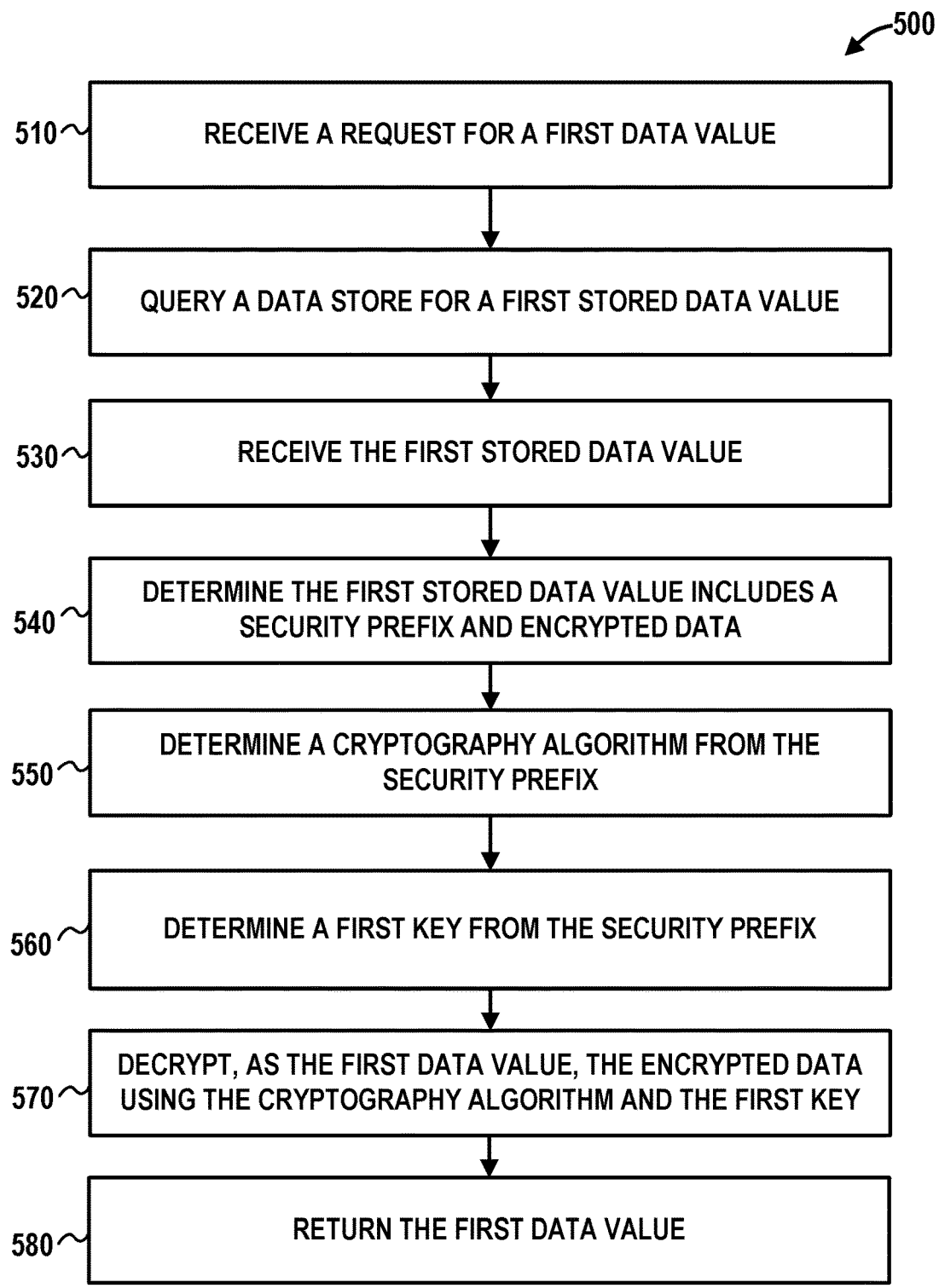
FIG. 5 is a diagram illustrating a flow diagram of a process for protecting data in accordance with respective examples.

FIG. 5 is a diagram illustrating a flow diagram of a process 500 for protecting data in accordance with respective examples. The process 500 may be executed on a computing device, such as the device shown in FIG. 6. The process 500 may be used to protect data.

At 510, a request for a first data value is received. In some examples, the data interface receives the request. The first data value may be an unencrypted data value that is stored in a data store. To protect the first data value, the first data value may be stored in an encrypted form. At 520, a data store is queried for a first stored data value that is associated with the first data value. For example, the first stored data value may be the encrypted version of the first data value. In some examples, the first stored data value is stored in a single field in the data store. For example, the first stored data value may be stored in a single column in a table of a relational database. In another example, the first stored data value is stored in a single field in a non-relational database.

At 530, the first stored data value is received from the data store. At 540, the first stored data value is analyzed to determine if the first stored data value includes a security prefix and encrypted data. In some examples, the stored data value is searched for one or more separators or delimiters. For example, the stored data value may be searched for ":", "|", etc. If the appropriate number of separators is found, the stored data value may be broken up into different values. For example, the security prefix and the encrypted data may be extracted from the stored data value.

The security prefix may include data describing how the encrypted data is encrypted. For example, the security prefix may include a cryptography algorithm and a key name. The security prefix may also include a separator or delimiter to demark the different parts of the security prefix. In one example, the same separator or delimiter is used to separate fields of the security prefix and the encrypted data. In another example, a different separator or delimiter is used. An example of using different separators is shown in the row associated with ID 013 of FIG. 2. At 550, a cryptography algorithm is determined from the security prefix. For example, the cryptography algorithm may be the Java Cryptography algorithm, an online API used to access a cryptographic algorithm, etc. At 560, a key is determined from the security prefix. The key may be determined via a key name or key identifier stored as part of the security prefix.

At 570, the encrypted data is decrypted using the key and the determined cryptography algorithm. The unencrypted value is the requested first data value. At 580, the first data value is returned.

In some examples, the stored data value is stored in the data store as a character string. The corresponding data value, however, may be a different type. For example, the data value may be an integer, a float, a Boolean, a date, etc., value. After decrypting the stored data value, the result may be an unencrypted string. The data type of the data value may be determined to not be a character or string type. Based on this determination, the unencrypted string may be converted into the appropriate data type of the data value. For example, the unencrypted string may be converted into a date, a Boolean, a integer, etc. The converted data may be returned as the first data value. Accordingly, the requesting application is not required to be aware that the data value is stored is an encrypted string. This feature allows flexibility in how data is encrypted without requiring software changes.

As described above, a first stored data value may include a security prefix. This security prefix may be created and stored when the data is written to the data store. In an example, the first data value is received to be stored in the data store. The first cryptography algorithm is determined. In some examples, an application that is storing the data will indicate or be configured to indicate the cryptography algorithm and key to use to encrypt the data. In another example, the data interface may also determine the cryptography algorithm and key to use via configuration data. As another example, the cryptography algorithm may be selected based on available resources. For example, if the load on a system is high a cheaper to compute cryptography algorithm may be selected. The load on a system may be determined using processor usage, memory usage, I/O latency, network latency, etc. In some embodiments, when the data encrypted for a cheaper to compute cryptography algorithm is written back to a data store, a new cryptography algorithm may be selected based on currently available resources. As another example, data may be written using a first cryptography algorithm, such as a cheaper to compute algorithm. Later as resources allow, data protected using the first cryptography algorithm may be searched for and rewritten using a different cryptography algorithm. This type of updating may also be used to help migrate data to a different cryptography algorithm, a new key, or a new version of a key. Accordingly, components of the security prefix may be used to query for data. The found data may be decrypted using the stored security prefix. The decrypted data may then be encrypted with updated parameters, such as a new cryptography algorithm, a new key, or a new key version. In addition, an updated security prefix that reflects the updated parameters is created. The encrypted data using the updated parameters along with the updated security prefix may then be written back to the data store, replacing the original data entry.

The first data value may be encrypted using the determined cryptography algorithm. In addition, the determined key may also be used. In some examples, a version of the key to use is determined and used to select the key used to encrypt the data. A security prefix is generated based on the cryptography algorithm. The security prefix includes an indication of the cryptography algorithm used to encrypt the data. The security prefix may also in an indication of the key used. In some examples, the security prefix may also include an indication of the version of the key used. The security prefix may be combined with the encrypted data and stored in a single field of the data store. In some examples, the security prefix may be stored in a separate field from the encrypted data. In these examples, the encrypted data has a corresponding security prefix stored in the data store. For example, there may be a one-to-one correspondence between a stored encrypted data value and a corresponding security prefix. This correspondence allows data security flexibility, as the key, key version, or cryptography algorithm may be updated on a value-by-value basis. This alleviates the need to port data when changes are made.

Stored data may also be synced across multiple data stores. Different data stores, however, may protect the data in different ways. In an example, a second cryptography algorithm associated with a second data store is determined. The first data value may then be encrypted with the second cryptography algorithm. In some examples, the second cryptography algorithm is different from the cryptography algorithm used to encrypt the first data value for the first data store. In addition, different keys or different versions of a key may be used to encrypt the first data value for the second data store. A second security prefix is created based on the second cryptography algorithm. In addition, the second security prefix may also include an indication of the second key and/or the version of the second key. The first data encrypted using the second security prefix may then be stored in a second data store, different from the original data store.

As described above, using security prefixes for values stored in a data store allows for flexibility in how data is protected. For example, different data values may use different cryptography algorithms, different keys, or different versions of a key. As an example, a table in a relational database may have a column. Data stored in this column in different rows may be protected differently from one another. For example, a request for two or more fields may be received. Data received from the data store may include multiple rows of data. Two data values, which may be from the same column or from the same row, may include the first stored data value and a second stored data value. The second stored data value is analyzed or searched for a second security prefix and a second encrypted data value. The second security prefix is used to determine a second cryptography algorithm and a second key. The second cryptography algorithm may be different from the first cryptography algorithm. The second key may be different from the first key used to decrypt the first data value. The second cryptography algorithm and the second key are used to decrypt the second encrypted data value. The decrypted second data value may then be returned along with the first data value.

While various examples describe how data may be protected by storing encrypted data, the disclosed examples are also able to work with data that is stored in an unencrypted format. For example, a third data value may be retrieved from a data store. The third data value may be data in the same column as the first data value or data in the same row as the first data value. The third data value is analyzed to determine the third data value is not encrypted. In some examples, this may be determine by not finding any separators or the wrong number of separators. In another example, a security prefix may be found. The security prefix may indicate that the data is not encrypted. For example, the cryptography algorithm in the security prefix may be "none" or "void" to indicate that the third data value is not encrypted. In these cases, the third data value may be returned without having to decrypt the third data value.

As another example of data protect flexibility, data may have its security prefix updated when the data is written to a data store. The data may originally be written having no encryption or using a first security prefix. Later, the same data may be written using a different security prefix. For example, the first data value may be encrypted using a key different from the first key as updated first encrypted data. An updated security prefix that includes an indication of the key different from the first key is generated. The updated security prefix along with the updated first encrypted data may then be stored in the single field in the data store. Writing the updated first encrypted data does not require any other data to be updated. For example, other protected data values remain unchanged. This allows encryption to be turned off or on without requiring data to be ported. Accordingly, data stores remain available and applications are not required to stop operation. This feature also allows encryption algorithms, keys, or the version of a key to change without requiring porting of other data to the different encryption algorithm, key, or version of a key.

As described above, a security prefix coupled to stored data allows increased data protection flexibility. Data encryption may be turned on or off without requiring any data porting. Further, the encryption algorithm, key, or key version may also change without requiring any data porting. As the data interface is able to use the security prefix to determine how to decrypt the data, previous encryption algorithms, keys, versions, may be used to access data. Then when the data is written back to the database using different encryption algorithm, key, or version, the security prefix is updated accordingly.

As an example of the flexibility of certain examples, a key rotation process may be implemented without extra overhead regarding data porting. An application of a data interface may rotate to a new version of a key. When reading previously written encrypted data, an older version of the key may be used to decrypt the data. The older version of the key is specified in the security prefix. When data is written back to a data store, the new version of the key may be used to encrypt the data. The data encrypted with the new version of the key along with an updated security prefix that indicates the new version of the key may be written back to the data store. Accordingly, data may be moved to the new version of the key as data is accessed. This is in contrast to having to port all the encrypted data to a new version of key when the key is rotated.

Figure 6:
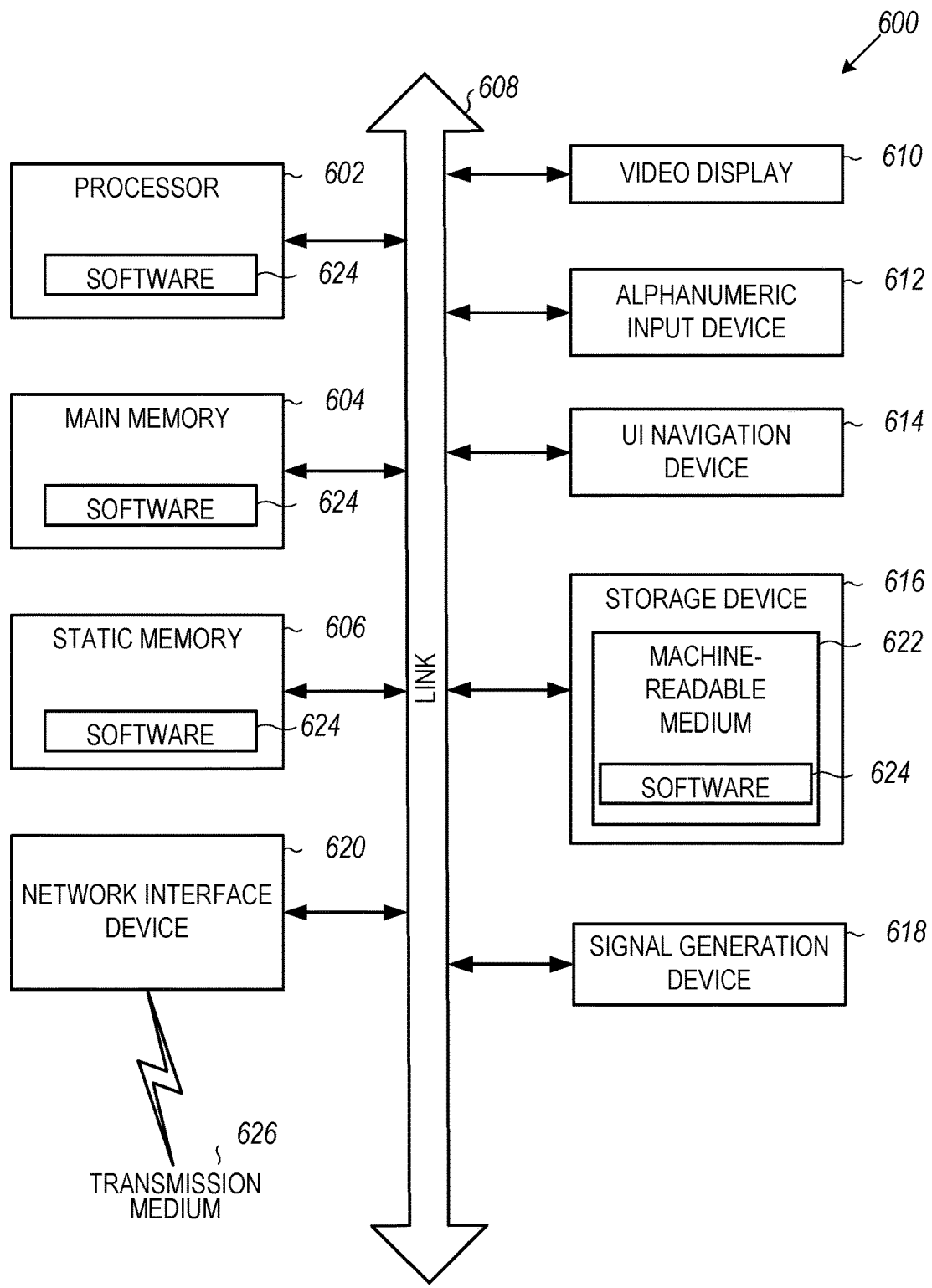
FIG. 6 is an example computing device that can be used in conjunction with the technologies described herein.

FIG. 6 is an example computing device that can be used in conjunction with the technologies described herein. In alternative embodiments, the computing device 600 may operate as a standalone device or may be connected (e.g., networked) to other computing devices. In a networked deployment, the computing device 600 may operate in the capacity of a server communication device, a client communication device, or both in server-client network environments. In an example, the computing device 600 may act as a peer computing device in peer-to-peer (P2P) (or other distributed) network environment. The computing device 600 may be a beacon reader, personal computer (PC), a tablet PC, a set top box (STB), a personal digital assistant (PDA), a mobile telephone, a smart phone, a web appliance, a network router, switch or bridge, or any computing device capable of executing instructions (sequential or otherwise) that specify actions to be taken by that computing device. Further, while only a single computing device is illustrated, the term "computing device" shall also be taken to include any collection of computing devices that individually or jointly execute a set (or multiple sets) of instructions to perform any one or more of the methodologies discussed herein, such as cloud computing, software as a service (SaaS), other computer cluster configurations. Computing device may be an implementation of data interface, a sync service, may implement components of the data protection system 100, and perform the method of FIG. 5.

Computing device 600 may include a hardware processor 602 (e.g., a central processing unit (CPU), a graphics processing unit (GPU), a hardware processor core, or any combination thereof), a main memory 604 and a static memory 606, some or all of which may communicate with each other via a link (e.g., bus) 608. The computing device 600 may further include a display unit 600, an input device 612 (e.g., a keyboard), and a user interface (UI) navigation device 614 (e.g., a mouse). In an example, the display unit 610, input device 612, and UI navigation device 614 may be a touch screen display. In an example, the input device 612 may include a touchscreen, a microphone, a camera (e.g., a panoramic or high-resolution camera), physical keyboard, trackball, or other input devices.

The computing device 600 may additionally include a storage device (e.g., drive unit) 616, a signal generation device 618 (e.g., a speaker, a projection device, or any other type of information output device), a network interface device 620, and one or more sensors, such as a global positioning system (GPS) sensor, compass, accelerometer, motion detector, or other sensor. The computing device 600 may include an input/output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.) via one or more input/output ports.

The storage device 616 may include a computing-readable (or machine-readable) storage media 622, on which is stored one or more sets of data structures or instructions 624 (e.g., software) embodying or utilized by any one or more of the techniques or functions described herein. In an example, at least a portion of the software may include an operating system and/or one or more applications (or apps) implementing one or more of the functionalities described herein. The instructions 624 may also reside, completely or at least partially, within the main memory 604, within the static memory 606, and/or within the hardware processor 602 during execution thereof by the computing device 600. In an example, one or any combination of the hardware processor 602, the main memory 604, the static memory 606, or the storage device 616 may constitute computing device (or machine) readable media.

While the computer-readable storage media 622 is illustrated as a single medium, a "computer-readable storage media" or "machine-readable storage media" may include a single medium or multiple media (e.g., a centralized or distributed database, and/or associated caches and servers) configured to store the one or more instructions 624.

In an example, a computer-readable storage media or machine-readable storage media may include any medium that is capable of storing, encoding, or carrying instructions for execution by the computing device 600 and that cause the computing device 600 to perform any one or more of the techniques of the present disclosure, or that is capable of storing, encoding or carrying data structures used by or associated with such instructions. Non-limiting computer-readable storage media examples may include solid-state memories, and optical and magnetic media. Specific examples of computer-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and optical media disks. The computer-readable storage media is non-transitory in that the storage media does not consist of transitory propagating signals.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. The network interface device 620 may use the transfer protocols to transmit data using transitory propagating signals.

In an example, the network interface device 620 may include one or more physical jacks (e.g., Ethernet, coaxial, or phone jacks) or one or more antennas to connect to the communications network 626. In an example, the network interface device 620 may include one or more wireless modems, such as a Bluetooth modem, a Wi-Fi modem or one or more modems or transceivers operating under any of the communication standards mentioned herein. In an example, the network interface device 620 may include a plurality of antennas to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. In an example, a transmission medium may include any intangible medium that is capable of storing, encoding or carrying instructions for execution by the computing device 600, and includes digital or analog communications signals or like communication media to facilitate communication of such software.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The above description is intended to be illustrative, and not restrictive. For example, the above-described examples (or one or more aspects thereof) may be used in combination with others. Other embodiments may be used, such as by one of ordinary skill in the art upon reviewing the above description. Further, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method for protecting data, the method comprising operations performed using an electronic processor, the operations comprising:
    receiving a request for a first data value;
    querying a data store, based on the request for the first data value, for a first stored data value associated with the first data value, wherein the first stored data value is stored in a single field in the data store;
    receiving, based on the query, the first stored data value;
    determining the first stored data value comprises a first security prefix and a first encrypted data value;
    determining, from the first security prefix, a first cryptography algorithm;
    determining, from the first security prefix, a first key;
    decrypting, as the first data value, the first encrypted data value using the first key and the first cryptography algorithm; and
    returning the first data value.

2. The method of claim 1, further comprising:
    determining a type of the first data value is not a character type, wherein the first stored data value is a character type; and
    converting the first data value into the type of the first data value before the returning the first data value.

3. The method of claim 1, further comprising:
    receiving the first data value to store in the data store;
    determining the first cryptography algorithm to encrypt the first data value;
    encrypting the first data value with the first cryptography algorithm;
    creating the first security prefix based on the first cryptography algorithm; and
    storing the first security prefix and the encrypted data value in the single field.

4. The method of claim 3, further comprising:
    determining a second cryptography algorithm to encrypt the first data value;
    encrypting the first data value with the second cryptography algorithm as a second encrypted data value;
    creating a second security prefix based on the second cryptography algorithm; and
    storing the second security prefix and the second encrypted data value in a single field in a second, different data store.

5. The method of claim 4, wherein the second cryptography algorithm is different than the first cryptograph algorithm.

6. The method of claim 3, further comprising determining the first key to encrypt the first data value, wherein the encrypting the first data value uses the first key, and wherein the first security prefix comprises an indication of the first key.

7. The method of claim 6, further comprising determining a first key version, wherein the determining the first key is based on the first key version, and wherein the first security prefix comprises an indication of the first key version.

8. The method of claim 1, wherein the receiving a request for the first data value comprises a request for two or more data fields, wherein the receiving the first stored data value comprises receiving a second stored data value, and wherein the method further comprises:
    determining the second stored data value comprises a second security prefix and a second encrypted data value;
    determining, from the second security prefix, a second cryptography algorithm;
    determining, from the second security prefix, a second key, wherein the second key is different from the first key;
    decrypting the second encrypted data value using the second key and the second cryptography algorithm as the second data value; and
    returning the second data value.

9. The method of claim 8, wherein the second cryptography algorithm is different from the first cryptography algorithm.

10. The method of claim 8, further comprising:
    receiving a third stored data value;

determining the third stored value comprises an unencrypted third data value; and returning the third data value.

11. The method of claim 1, further comprising:

encrypting the first data value using a third key, different than the first key, as updated first encrypted data;

creating a third security prefix for the first value data based on the third key; and storing the third security prefix and the updated first encrypted data value in the single field in the data store.

12. The method of claim 11, wherein encrypting the first data using the third key comprises using a third cryptography algorithm different from the second cryptography algorithm, wherein the third security prefix comprises an indication of the third cryptography algorithm.

13. A system to protect data, the system comprising:

a memory; and a hardware processor coupled to the memory, wherein the hardware processor is configured to:

receive a request for a first data value;

query a data store, based on the request for the first data value, for a first stored data value associated with the first data value, wherein the first stored data value is stored in a single field in the data store;

receive, based on the query, the first stored data value;

determine the first stored data value comprises a first security prefix and a first encrypted data value;

determine, from the first security prefix, a first cryptography algorithm;

determine, from the first security prefix, a first key;

decrypt, as the first data value, the first encrypted data value using the first key and the first cryptography algorithm; and return the first data value.

14. The system of claim 13, wherein the hardware processor is further configured to:

determine a type of the first data value is not a character type, wherein the first stored data value is a character type; and convert the first data value into the type of the first data value before the returning the first data value.

15. The system of claim 13, wherein the hardware processor is further configured to:

receive the first data value to store in the data store;

determine the first cryptography algorithm to encrypt the first data value;

encrypt the first data value with the first cryptography algorithm;

create the first security prefix based on the first cryptography algorithm; and store the first security prefix and the encrypted data value in the single field.

16. The system of claim 15, wherein the hardware processor is further configured to:

determine a second cryptography algorithm to encrypt the first data value;

encrypt the first data value with the second cryptography algorithm as a second encrypted data value;

create a second security prefix based on the second cryptography algorithm; and store the second security prefix and the second encrypted data value in a single field in a second, different data store.

17. A non-transitory computer-readable storage medium storing computer-executable instructions that when executed by a processor cause the processor to perform operations comprising:

receiving a request for a first data value;

querying a data store, based on the request for the first data value, for a first stored data value associated with the first data value, wherein the first stored data value is stored in a single field in the data store;

receiving, based on the query, the first stored data value;

determining the first stored data value comprises a first security prefix and a first encrypted data value;

determining, from the first security prefix, a first cryptography algorithm;

determining, from the first security prefix, a first key;

decrypting, as the first data value, the first encrypted data value using the first key and the first cryptography algorithm; and returning the first data value.

18. The non-transitory computer-readable storage medium of claim 17, wherein the operations further comprise:

determining a type of the first data value is not a character type, wherein the first stored data value is a character type; and converting the first data value into the type of the first data value before the returning the first data value.

19. The non-transitory computer-readable storage medium of claim 17, wherein the operations further comprise:

receiving the first data value to store in the data store;

determining the first cryptography algorithm to encrypt the first data value;

encrypting the first data value with the first cryptography algorithm;

creating the first security prefix based on the first cryptography algorithm; and storing the first security prefix and the encrypted data value in the single field.

20. The non-transitory computer-readable storage medium of claim 19, wherein the operations further comprise:

determining a second cryptography algorithm to encrypt the first data value;

encrypting the first data value with the second cryptography algorithm as a second encrypted data value;

creating a second security prefix based on the second cryptography algorithm; and storing the second security prefix and the second encrypted data value in a single field in a second, different data store.

* * * * *